May 21, 1957 — G. LARSON — 2,792,654
SPRING CLIP
Filed March 1, 1956
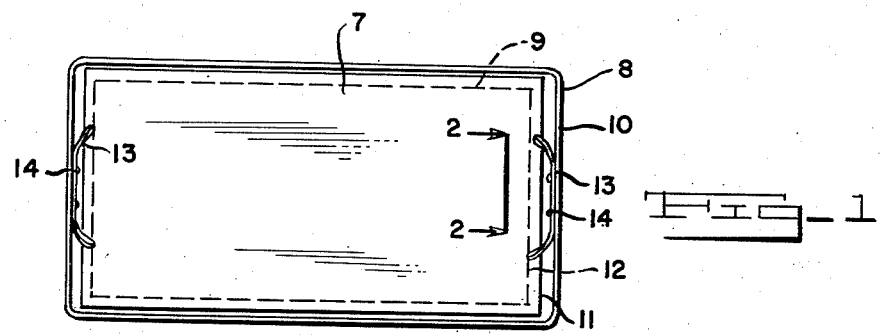
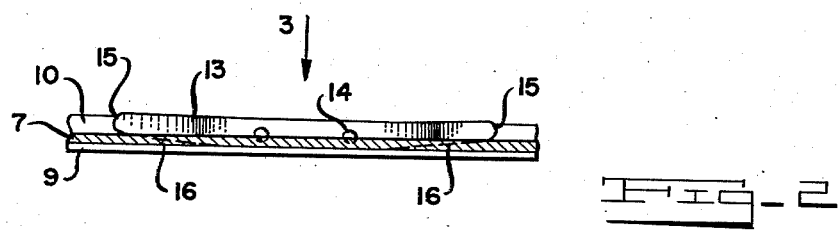
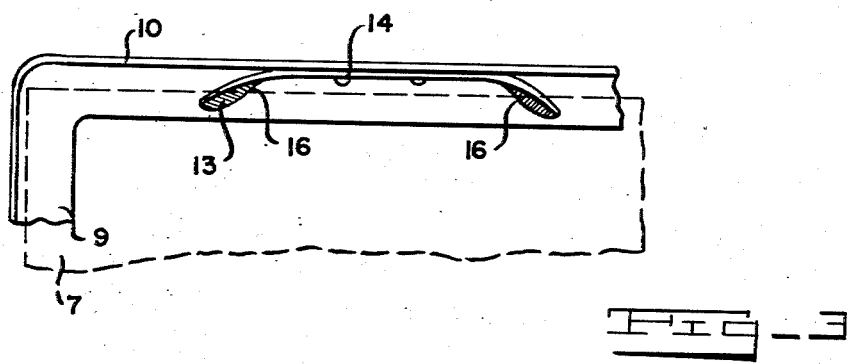
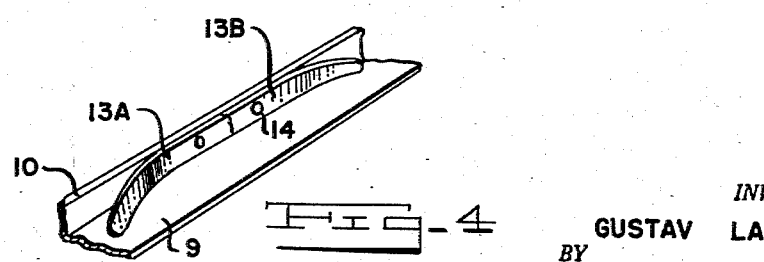
INVENTOR.
GUSTAV LARSON
BY Edward M. Apple
ATTORNEY

United States Patent Office 2,792,654
Patented May 21, 1957

2,792,654

SPRING CLIP

Gustav Larson, Detroit, Mich.

Application March 1, 1956, Serial No. 568,752

3 Claims. (Cl. 40—125)

This invention relates to fastening devices and has particular reference to a spring clip, for use in detachably securing two elements together, and has particular reference to a spring clip for use in securing a frame to a conventional automobile license plate.

An object of the invention is to generally improve fastening devices of the character indicated, and to provide a spring clip which may be economically manufactured and assembled with other elements.

Another object of the invention is to provide a spring clip, which is constructed and arranged, so that a marginal element, such as a frame may be detachably secured to any plate-like elements, having a variety of thicknesses, without the necessity of doing any work on the plate like element such as machining, drilling holes therein, or otherwise defacing the plate.

Although I have herein disclosed the use of the spring clip for the purpose of attaching a frame to a license plate, it will be understood that it could be used with equal facility in securing a glass in a picture frame, and the like.

The foregoing and other objects and advantages of the invention will become more apparent as the description proceeds, reference being made from time to time to the accompanying drawing forming part of the within disclosure, in which drawing:

Fig. 1 is a plan view of the rear of an automobile license plate and frame combination, which employs as the fastening means the spring clip embodying the invention.

Fig. 2 is a fragmentary section, taken substantially on the line 2—2 of Fig. 1.

Fig. 3 is an enlarged, fragmentary, plan view, looking in the direction of the arrow 3 in Fig. 2.

Fig. 4 is a modified form of the spring clip.

Referring now more particularly to the drawing, it will be understood that in the embodiment herein disclosed, the reference character 7 indicates a conventional automobile license plate to which is detachably mounted a marginal frame 8, which is substantially L shaped in cross section, the long leg 9 of the L being disposed in a horizontal plane and the short leg 10 of the L, being disposed in a vertical plane. It will be noted, as at 11, that the edges of the license plate 7 overlie the inside edges 12 of the frame 8, and the ends of the spring clip 13 overlie the ends of the license plate 7, exerting pressure thereon, to gently urge the license plate into close contact with the leg 9 of the frame. The spring clips 13 are secured to the short leg 10, of the frame, by any suitable means, such as rivets 14. Although I have shown the spring clips 13, in Figs. 1 to 3, as being made in one piece, it will be understood that they may be made in halves 13A and 13B, as shown in Fig. 4.

Each spring clip 13 is preferably stamped from a sheet of metal, formed, and then heat treated. In the stamping and forming process, the ends 15 are preferably rounded. The edges 16 are inclined as shown in Fig. 2, and the sections having the inclined edges 16, are slightly twisted about their longitudinal axes, to provide a varying degree of pitch. This permits the spring clips 13, to be used with plates 7, having different thicknesses, without varying the tension of the springs, or distorting their normal shape.

It is believed that the operation of the device is obvious from the foregoing description.

Having described my invention, what I claim and desire to secure by Letters Patent is:

1. A spring clip, comprising a rectangular length of metal, having at least one inclined, longitudinal edge, and having the inclined edge portion slightly twisted about its longitudinal axis to provide varying degrees of pitch.

2. A spring clip, comprising a rectangular length of spring metal, with rounded ends, an inclined longitudinal edge adjacent to each rounded end, the inclined longitudinal edge portions being slightly twisted about their longitudinal axes, to provide varying degrees of pitch.

3. In combination, a plate-like member, a frame, and means for detachably securing the plate and frame together, said means comprising one or more spring clips, each consisting of a length of metal, having an inclined lower longitudinal edge, said length of metal being twisted about a portion of its longitudinal axis to provide an area of variable pitch.

No references cited.